UNITED STATES PATENT OFFICE.

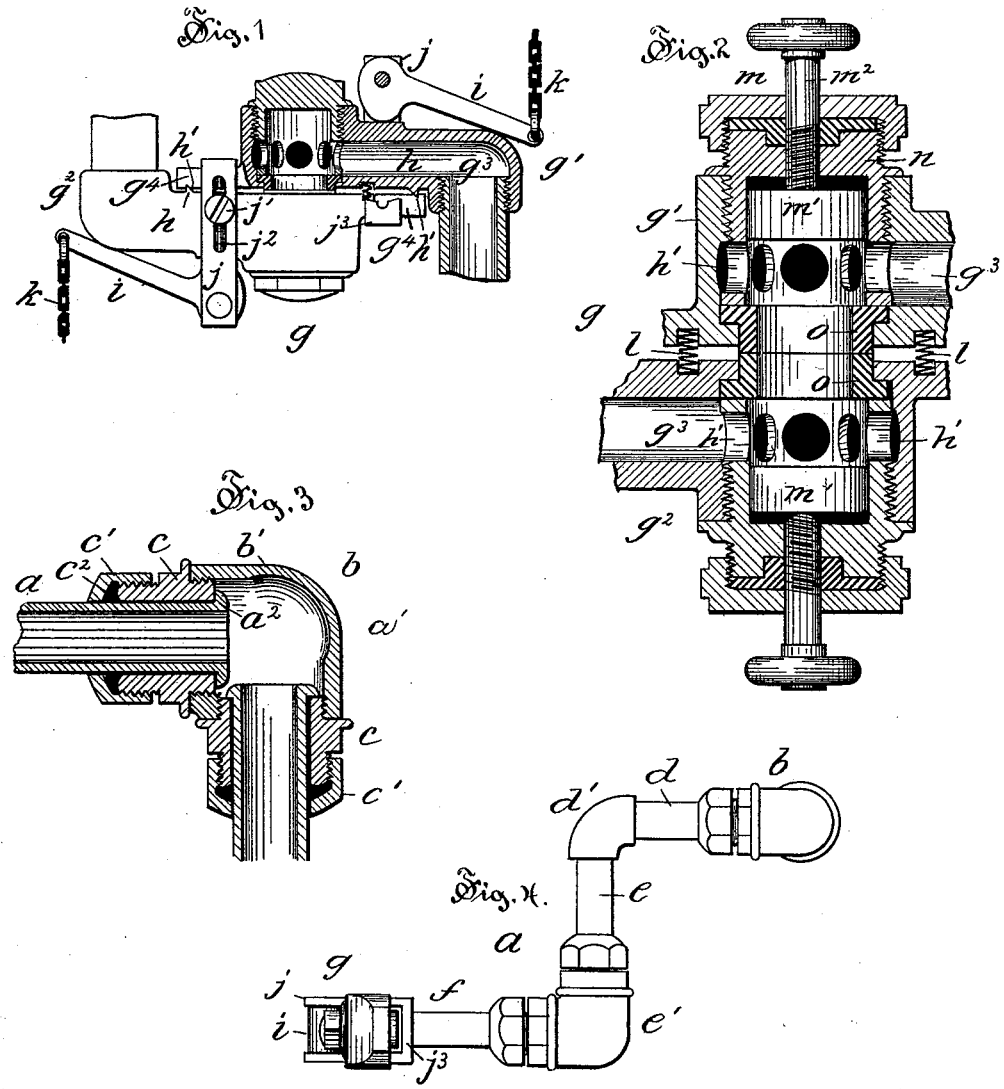

OSCAR JOSEPH MEYER, OF HARTFORD, CONNECTICUT.

PIPE-COUPLING.

SPECIFICATION forming part of Letters Patent No. 403,767, dated May 21, 1889.

Application filed April 20, 1887. Serial No. 235,504. (No model.)

*To all whom it may concern:*

Be it known that I, OSCAR JOSEPH MEYER, of Hartford, in the county of Hartford and State of Connecticut, have invented certain new and useful Improvements in Pipe-Couplings, of which the following is a full, clear, and exact description, whereby any one skilled in the art can make and use the same.

My improvement relates to the class of couplings that are adapted for use on pipes for conveying steam, air, or water, and it is particularly intended for use on the pipes of the heating or brake system of railway-trains.

The object of my improvement is to provide a coupling that may be readily operated and that will be effective in forming a tight joint; and to this end my improvement consists in the combination of parts, as hereinafter set forth and claimed.

Referring to the drawings, Figure 1 is a top view of the coupling, showing one part in central section. Fig. 2 is a view in central section of the coupling provided with valves and on an enlarged scale. Fig. 3 is a detail view in central section of a pivot-joint on the pipe on which the coupling is used. Fig. 4 is an end view of the jointed pipe and one-half of a coupling.

In the accompanying drawings, the letter $a'$ denotes a section of piping made flexible by the use of a pivot-joint, $b$; $a$, the end of a steam-pipe that forms part of the circulatory system of steam heating apparatus as used on cars. The end of pipe $a$ is enlarged by a collar or a flange, $a^2$, and the gland $c$ fits upon the pipe with one end threaded to fit into the threaded socket in the quarter-turn or elbow $b'$ and the other end threaded to receive a cap, $c'$, between which and the end of the gland an annular packing, $c^2$, is placed. In order to provide for the proper yielding of this flexible length or section of piping $a'$, the length of pipe $d$ is secured to the body part of the joint by a like device, (see Fig. 3,) and this length $d$, lying in a horizontal position, is connected by an ordinary elbow, $d'$, to the vertical length $e$, and this in turn is united by a pivot-joint, $e'$, the same in construction as the joint $b$, to a horizontal length, $f$, of pipe, that is secured at its farther end to one body part of a coupling, $g$. This coupling $g$ is composed of the two similar body parts $g'$ $g^2$, the steam-way $g^3$ through the shank or neck of the coupling part having a lateral opening on the side that forms the bearing-face of the body part. A projecting flange, $h$, on each body part takes into a corresponding socket, $h'$, in the opposite and complementary body part, and these serve as guides to enable the openings that form the steamways in the body parts to be readily and surely placed opposite each other, while the cam-levers $i$ and yokes $j$ serve as means for firmly clamping the body parts together. Each yoke $j$ is secured to its body part by a screw, $j'$, passing through a slot, $j^2$, in the side part of the yoke, the cross-bar $j^3$ of which grasps a projecting arm, $g^4$, on the opposite body part and holds it firmly under by swinging the handle of the cam-lever $i$ toward the coupling. Each cam-lever is pivoted between the side parts of a yoke or the end opposite the cross-bar, and has a cam adapted to slide and thrust against a bearing-surface on the back of the coupling. The cam-lever may be operated to release the hold of the yoke upon the parts by pulling the end of the lever outward, as by means of the chain $k$, that is attached thereto at one end, while the other end is secured to the car-platform in convenient position for use.

A spring, $l$, is secured to each body part of the coupling on its bearing-face and serves to hold the parts far enough apart to prevent the flange $h$ from engaging the respective sockets.

In order to control the flow of steam through the coupling and joint when the points are uncoupled, the valve $m$ is used. This consists of a disk, $m'$, borne on a screw-spindle, $m^2$, that operates in the plug $n$, by means of which it is secured to the coupling. The wall of the tubular plug is perforated with ports $n'$, while its end rests upon a packing, $o$, that has a flange overhanging the inturned flange on the body part to prevent the falling out of the packing when the body parts are disengaged or uncoupled. By means of these valves the ports may be opened or closed at will and the flow of steam regulated.

I claim as my invention—

1. In combination with a section of pipe, the two-part coupling made up of the body parts $g'$ $g^2$, having on their bearing-faces the corresponding flanges $h$ and sockets $h'$, the yoke $j$, attached to each body part, the cam-levers pivoted to the yoke, and the washers located between the body parts of the coupling, all substantially as described.

2. The improved coupling consisting of the similar body parts, each part having a bearing-surface on its side and the communicating openings, the yoke secured to each body part by a screw passing through a slot in the side part of the yoke, the cam-lever pivoted to the yoke on the side opposite the cross-bar, and a projecting arm, $g^4$, all substantially as described.

3. In a coupling, the combination of the similar body parts $g'$ $g^2$, both having a steamway, $g^3$, the flange $h$ and a socket, $h'$, on the bearing-face of the body part, the yoke $j$, with the connected cam-lever $i$, and secured to its respective body part by a screw passing through the slot in the side part of the yoke, the projecting arm $g^4$, and the springs located between the bearing-faces of the body parts, all substantially as described.

4. In combination, in a pipe-coupling, the similar body parts $g'$ $g^2$, with steamway $g^3$ and arm $g^4$, and valve $m$, the packings held between the flange on the body part and the end of the plug $n$ that has ports $n'$, the valve $m$, and the clamping device consisting of the yoke $j$, with cross-bar $j^3$ and cam-lever $i$, pivoted to the yoke, all substantially as described.

5. A pipe-coupling consisting of two similar hollow parts, each having a projecting arm and a lateral opening, two yokes, each having a slot in one of its sides, a cam pivoted in each of said yokes, plugs secured in each of said parts, and valves in said plugs, said parts being combined substantially as described.

OSCAR JOSEPH MEYER.

Witnesses:
CHAS. L. BURDETT,
T. D. FINLEY.